(12) United States Patent
Kobayashi

(10) Patent No.: US 10,142,389 B2
(45) Date of Patent: Nov. 27, 2018

(54) INFORMATION PROCESSING SYSTEM, INFORMATION PROCESSING METHOD, COMMUNICATION TERMINAL, SERVER, AND CONTROL METHODS AND CONTROL PROGRAMS THEREOF

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 52 days.

(21) Appl. No.: 14/387,469

(22) PCT Filed: Feb. 28, 2013

(86) PCT No.: PCT/JP2013/055546
§ 371 (c)(1),
(2) Date: Sep. 23, 2014

(87) PCT Pub. No.: WO2013/140995
PCT Pub. Date: Sep. 26, 2013

(65) Prior Publication Data
US 2015/0074223 A1 Mar. 12, 2015

(30) Foreign Application Priority Data
Mar. 23, 2012 (JP) .................................. 2012-067497

(51) Int. Cl.
*G06F 15/16* (2006.01)
*H04L 29/06* (2006.01)
(Continued)

(52) U.S. Cl.
CPC ............ *H04L 65/605* (2013.01); *H04L 67/10* (2013.01); *H04W 4/50* (2018.02); *H04W 4/60* (2018.02); *H04L 63/145* (2013.01); *H04W 12/12* (2013.01)

(58) Field of Classification Search
CPC ..... H04L 67/06; H04L 65/4084; H04L 67/10; H04L 65/607; H04L 67/42;
(Continued)

(56) References Cited

U.S. PATENT DOCUMENTS 6,092,114 A 7/2000 Shaffer et al.
6,341,133 B1 1/2002 Kawamoto et al.
(Continued)

FOREIGN PATENT DOCUMENTS

CN 1172568 A 2/1996
JP 9-237233 9/1997
(Continued)

OTHER PUBLICATIONS

Japanese Office Action dated Jan. 5, 2016, by the Japanese Patent Office in counterpart Japanese Patent Application No. 2012-067497.
(Continued)

*Primary Examiner* — Arvin Eskandarnia
*Assistant Examiner* — Thao Duong
(74) *Attorney, Agent, or Firm* — Finnegan, Henderson, Farabow, Garrett & Dunner, L.L.P.

(57) ABSTRACT

A system of this invention is directed to an information processing system in which a server processes a file unprocessable by a communication terminal and the communication terminal outputs the processed file. The information processing system includes the communication terminal and the server. The communication terminal includes a loader that loads a file, a determiner that determines whether the communication terminal has an application used to process the loaded file, a requester that transmits a request, to the server connected via a wireless communication network, to supply output data having the same contents as the unprocessable loaded file, for which it is determined that the communication terminal has no application, and being to be (Continued)

output for a user at the communication terminal, a receiver that receives the output data from the server, and an output unit that performs output for the user based on the received output data. The server includes an executer that executes an application used to process a file in response to the request, and a transmitter that transmits an execution result by the application to the receiver as the output data.

18 Claims, 12 Drawing Sheets

(51) Int. Cl.
*H04L 29/08* (2006.01)
*H04W 4/50* (2018.01)
*H04W 4/60* (2018.01)
*H04W 12/12* (2009.01)

(58) Field of Classification Search
CPC ... H04L 65/4092; H04L 65/605; H04L 67/02; H04N 21/8456; H04N 21/2393; H04N 21/44004; H04N 21/2396; H04N 21/2182; H04N 21/23103
See application file for complete search history.

(56) References Cited

U.S. PATENT DOCUMENTS

| | | | | |
|---|---|---|---|---|
| 6,385,586 | B1* | 5/2002 | Dietz | G06F 17/289 704/251 |
| 8,812,667 | B1* | 8/2014 | Chung | H04L 63/145 709/202 |
| 2002/0157028 | A1 | 10/2002 | Koue et al. | |
| 2003/0120478 | A1* | 6/2003 | Palmquist | G06F 17/2863 704/3 |
| 2003/0191799 | A1* | 10/2003 | Araujo | H04L 63/0272 709/203 |
| 2005/0114528 | A1* | 5/2005 | Suito | H04L 12/1822 709/228 |
| 2005/0186913 | A1* | 8/2005 | Varanda | H04M 1/24 455/67.11 |
| 2005/0278774 | A1* | 12/2005 | Eshleman | H04N 5/775 725/153 |
| 2006/0105816 | A1* | 5/2006 | Hwang | H04M 1/021 455/566 |
| 2007/0124575 | A1 | 5/2007 | Koue et al. | |
| 2007/0124576 | A1 | 5/2007 | Koue et al. | |
| 2007/0208931 | A1 | 9/2007 | Koue et al. | |
| 2007/0283048 | A1 | 12/2007 | Theimer et al. | |
| 2009/0171917 | A1 | 7/2009 | Chou | |
| 2009/0193030 | A1* | 7/2009 | Gorsev | G06F 17/30569 |
| 2009/0213426 | A1 | 8/2009 | Honda | |
| 2009/0282086 | A1* | 11/2009 | Heimes | H04L 51/12 |
| 2010/0191815 | A1 | 7/2010 | Koue et al. | |
| 2011/0246922 | A1* | 10/2011 | Koenig | G06F 9/461 715/771 |
| 2012/0109632 | A1* | 5/2012 | Sugiura | G06F 17/289 704/3 |
| 2014/0197232 | A1* | 7/2014 | Birkler | G06F 21/313 235/375 |

FOREIGN PATENT DOCUMENTS

| | | |
|---|---|---|
| JP | 2002-189684 | 7/2002 |
| JP | 2003-108474 | 4/2003 |
| JP | 2003-141028 | 5/2003 |
| JP | 2006-252152 | 9/2006 |
| JP | 2009-60234 | 3/2009 |
| JP | 2009-151572 | 7/2009 |
| JP | 2009-200975 | 9/2009 |
| JP | 2009-205274 | 9/2009 |
| JP | 2009-237879 | 10/2009 |
| TW | 200928978 | 7/2009 |

OTHER PUBLICATIONS

Extended European Search Report dated Sep. 25, 2015 by the European Patent Office in counterpart European Patent Application No. 13764717.8.

International Search Report dated Mar. 26, 2013 in corresponding PCT International Application.

Patent Examination Report dated Jul. 13, 2015 by the Australian Patent Office in counterpart Australian Patent Application No. 2013236514.

Chinese Office Action dated May 3, 2016, by the Chinese Patent Office in counterpart Chinese Patent Application No. 201380016069.7.

* cited by examiner

INFORMATION PROCESSING SYSTEM, INFORMATION PROCESSING METHOD, COMMUNICATION TERMINAL, SERVER, AND CONTROL METHODS AND CONTROL PROGRAMS THEREOF

CROSS-REFERENCE TO RELATED PATENT APPLICATIONS

This application is a National Stage Entry of International Application No. PCT/JP2013/055546, filed Feb. 28, 2013, which claims priority from Japanese Patent Application No. 2012-067497, filed Mar. 23, 2012. The entire contents of the above-referenced applications are expressly incorporated herein by reference.

TECHNICAL FIELD

The present invention relates to a technique for processing files that a communication terminal has acquired from various providing sources.

BACKGROUND ART

In the above technical field, patent literature 1 discloses a technique of reading out, using a portable phone, data stored in a server and utilizing the data.

CITATION LIST

Patent Literature

Patent literature 1: Japanese Patent Laid-Open No. 2009-151572

SUMMARY OF THE INVENTION

Technical Problem

In the technique described in the above literature, however, when a file unprocessable by the portable phone is read out, processing of the file needs to be abandoned.

The present invention enables to provide a technique of solving the above-described problem.

Solution to Problem

One aspect of the present invention provides a system comprising:
a communication terminal; and
a server,
the communication terminal comprising:
a loader that loads a file;
a determiner that determines whether the communication terminal has an application used to process the loaded file;
a requester that transmits a request, to a server connected via a wireless communication network, to supply output data having the same contents as the unprocessable loaded file and being to be output for a user at the communication terminal, when the determiner has determined that the communication terminal does not have the application for the loaded file;
a receiver that receives the output data from the server; and
an output unit that performs output for the user based on the received output data, and
the server comprising:
an executer that executes an application used to process a file to make the output data in response to the request from the requester; and
a transmitter that transmits an execution result by the application to the receiver as the output data.

Another aspect of the present invention provides an information processing method comprising:
loading a file into a communication terminal;
determining, at the communication terminal, whether the communication terminal has an application used to process the loaded file;
transmitting a request, from the communication terminal to a server connected via a wireless communication network, to support output data having the same contents as the unprocessable loaded file, for which it is determined in the determining step that the communication terminal has no application, and being to be output for a user at the communication terminal;
executing an application used to process a file to make the output data at the server in response to the request from the communication terminal in the requesting step;
transmitting an execution result by the application from the server to the communication terminal as the output data;
receiving the output data from the server by the communication terminal; and performing output for the user based on the received output data at the communication terminal.

Still other aspect of the present invention provides a communication terminal comprising:
a loader that loads a file;
a determiner that determines whether the communication terminal has an application used to process the loaded file;
a requester that transmits a request, to a server connected via a wireless communication network, to supply output data having the same contents as the unprocessable loaded file, for which the determiner has determined that the communication terminal has no application, and being to be output for a user at the communication terminal;
a receiver that receives the output data from the server; and
an output unit that performs output for the user based on the received output data.

Still other aspect of the present invention provides a control method of a communication terminal, comprising:
loading a file;
determining whether the communication terminal has an application used to process the loaded file;
transmitting a request, to a server connected via a wireless communication network, to supply output data having the same contents as the unprocessable loaded file, for which it is determined in the determining step that the communication terminal has no application, and being to be output for a user at the communication terminal;
receiving the output data from the server; and
performing output for the user based on the received output data.

Still other aspect of the present invention provides a control program of a communication terminal, which causes a computer to execute a method, comprising:
loading a file;
determining whether the communication terminal has an application used to process the loaded file;
transmitting a request, to a server connected via a wireless communication network, to supply output data having the same contents as the unprocessable loaded file, for which it is determined in the determining step that the communication terminal has no application, and being to be output for a user at the communication terminal;

receiving the output data from the server; and performing output for the user based on the received output data.

Still other aspect of the present invention provides a server included in the above-described information processing system, comprising:

an executer that executes an application used to process a file to make the output data in response to a request from the requester; and a transmitter that transmits an execution result by the application to the receiver as output data.

Still other aspect of the present invention provides a control method of a server included in the above-described information processing system, the method comprising:

executing an application used to process the unprocessable loaded file in response to the request from the requester; and transmitting an execution result by the application to the receiver as output data.

Still other aspect of the present invention provides a control program of a server included in the above-described information processing system, which causes a computer to execute a method, comprising:

executing an application used to process the unprocessable loaded file in response to the request from the requester; and transmitting an execution result by the application to the receiver as output data.

Advantageous Effects of Invention

According to the present invention, it is possible to process a file unprocessable by a communication terminal using a server and output the file to the communication terminal.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing system 100 according to the first embodiment of the present invention will be described with reference to FIG. 1.

Figure 1:
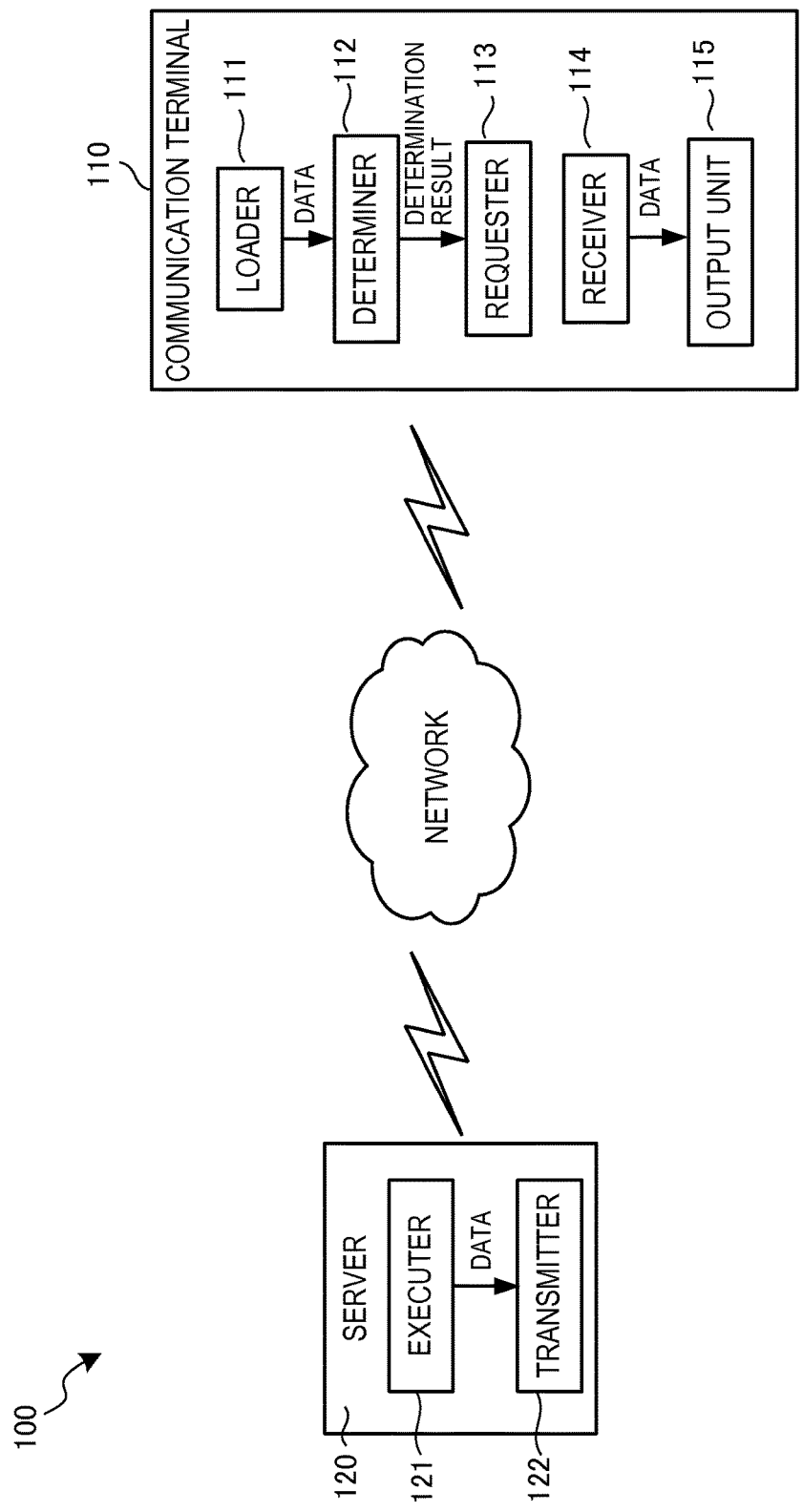
FIG. 1 is a block diagram showing the arrangement of an information processing system according to the first embodiment of the present invention.

As shown in FIG. 1, the information processing system 100 includes a communication terminal 110 and a server 120. The communication terminal 110 includes a loader 111, a determiner 112, a requester 113, a receiver 114, and an output unit 115.

The loader 111 of the communication terminal 110 loads a file. The determiner 112 determines whether the communication terminal has an application used to process the loaded file. The requester 113 requests, from the server 120 connected via a wireless communication network, output data that has the same contents as an unprocessable file for which the determiner 112 has determined that the communication terminal has no application, and is to be output for the user at the communication terminal. The receiver 114 receives the output data from the server 120. The output unit 115 performs output for the user based on the received output data.

An executer 121 of the server 120 executes an application used to process an unprocessable file in response to a request from the requester 113. A transmitter 122 transmits the execution result of the application to the receiver 114 as output data.

With the above-described arrangement and operation, according to the information processing system of this embodiment, it is possible to process a file unprocessable by the communication terminal using an external processing apparatus and output the file to the communication terminal.

Second Embodiment

Figure 2:
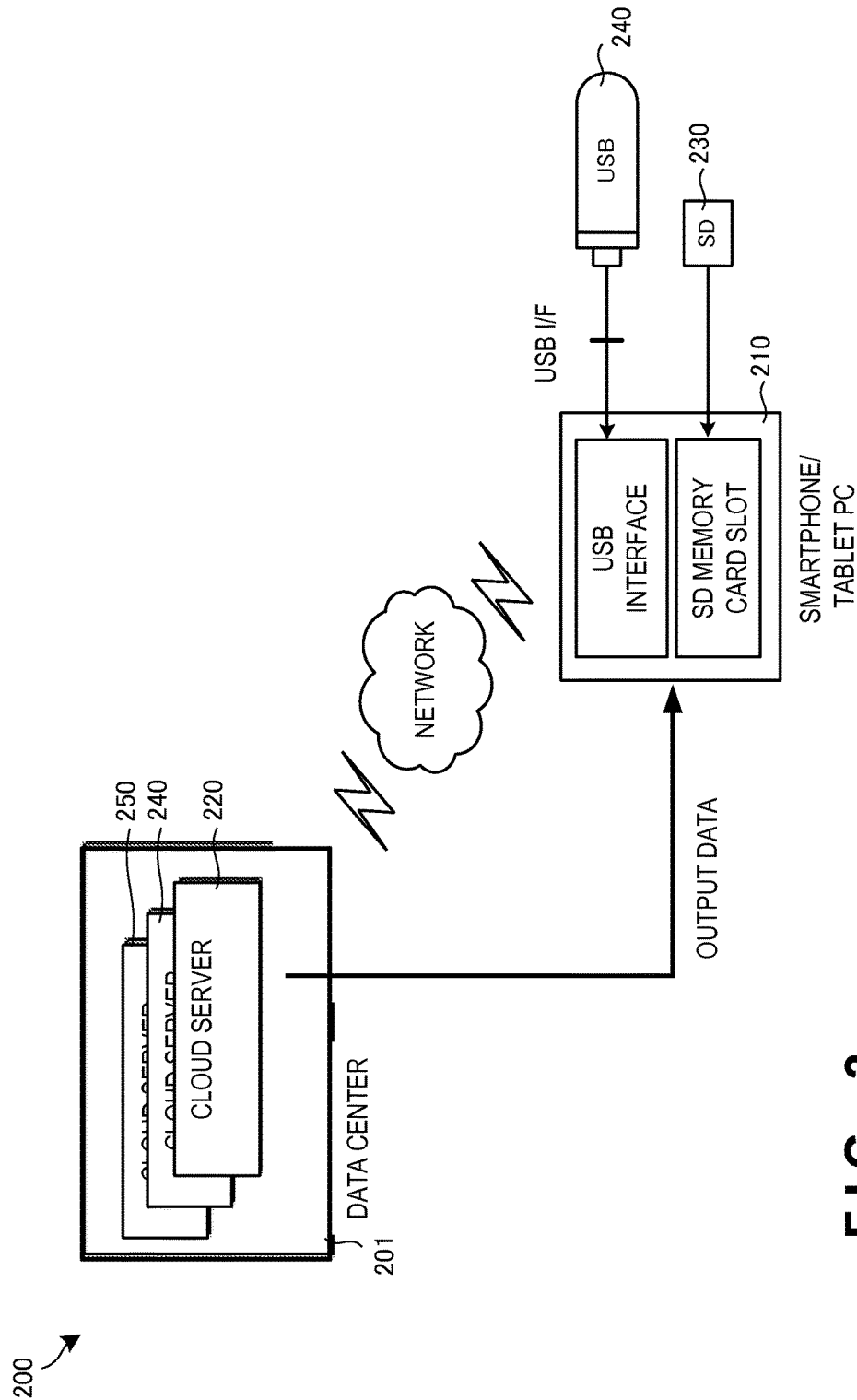
FIG. 2 is a block diagram showing the outline of an information processing system according to the second embodiment of the present invention.

An information processing system 200 according to the second embodiment of the present invention will be described next with reference to FIG. 2. The information processing system 200 is formed from a smartphone 210 that is an example of a communication terminal, and a cloud server 220.

The smartphone 210 detects insertion/removal of an SD memory card 230 in the SD memory slot, or detects connection/disconnection of a USB memory 240 in the USB interface. In this embodiment, an example in a case where the SD memory card 230 is detected will be explained.

When a detector 416 detects connection of the SD memory card 230, the smartphone 210 recognizes the file system and file configuration of the SD memory card 230. A file loader 411 loads a file stored in the SD memory card 230. Upon determining that the loaded file cannot be expanded using an application of the smartphone 210, the smartphone 210 requests, via the network, the cloud servers 220, 250, and 260 in a data center 201 to expand the file.

Upon accepting the request from the smartphone 210, the cloud server 220 reads out the file and selects an optimum application to expand the file. Output data (display data) outputtable for the user by the smartphone 210 is transmitted from the expanded file to the smartphone 210 connected via the network. Note that in this embodiment, an example will be described in which the file is transmitted from an auxiliary storage device such as an SD memory card or USB memory connected to the smartphone 210 to the cloud server 220. However, the file storage source is not limited to those.

Figure 3:
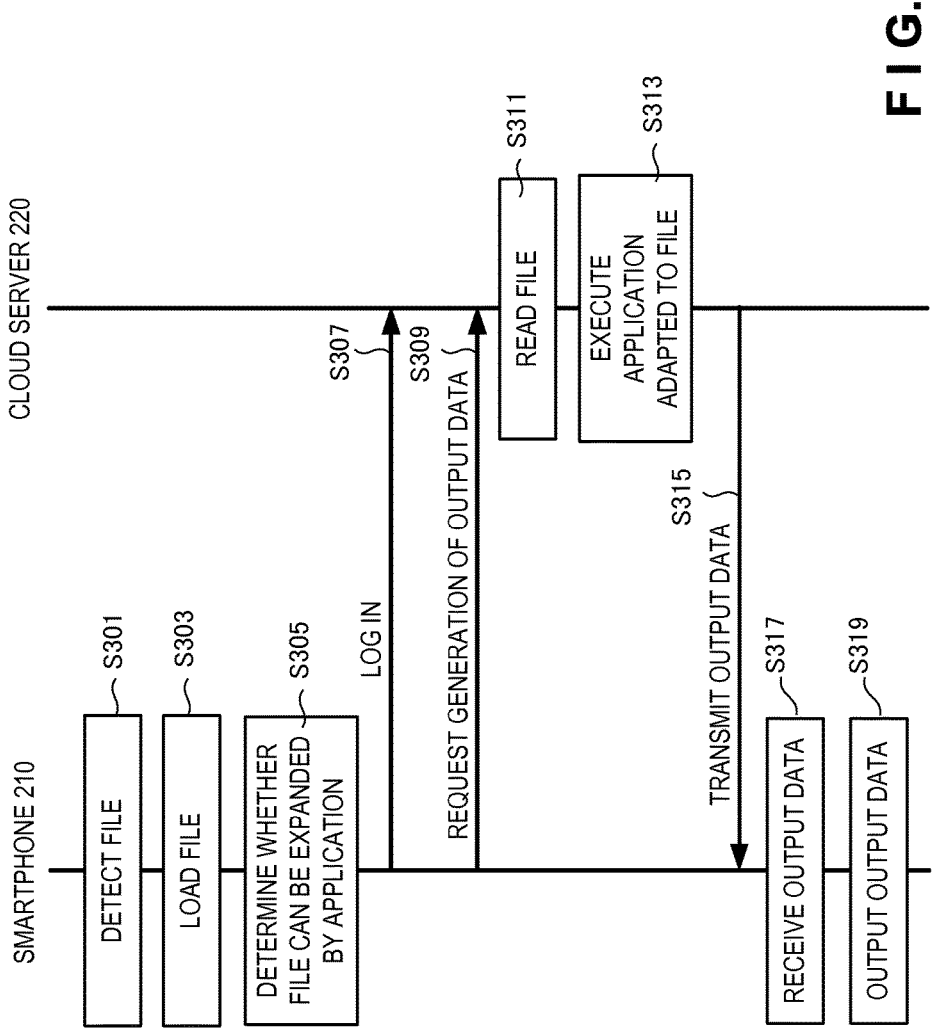
FIG. 3 is a sequence chart showing the sequence of processing of the information processing system according to the second embodiment of the present invention.

The sequence of overall processing of the information processing system 200 will be described with reference to the sequence chart of FIG. 3.

In step S301, the detector 416 of the smartphone 210 detects the SD memory card 230. In step S303, the smartphone 210 reads out a file stored in the SD memory card 230. In step S305, the smartphone 210 determines whether the smartphone 210 can process the file using an application held in it. Upon determining that no application can process the file, the smartphone 210 accesses and logs in to the cloud server 220 in step S307. In step S309, the smartphone 210 requests, from the cloud server 220, output data outputtable for the user at the smartphone 210.

In step S311, the cloud server 220 accepts the requested file from the smartphone 210. In step S313, the cloud server 220 selects and executes an application that expands the accepted file and acquires output data outputtable for the user by the smartphone 210. In step S315, the cloud server 220 transmits the output data as the execution result of the application to the smartphone 210. In step S317, the smartphone 210 receives the output data from the cloud server 220. In step S319 the smartphone 210 outputs the received output data for the user.

(Functional Arrangement of Information Processing System)

Figure 4:
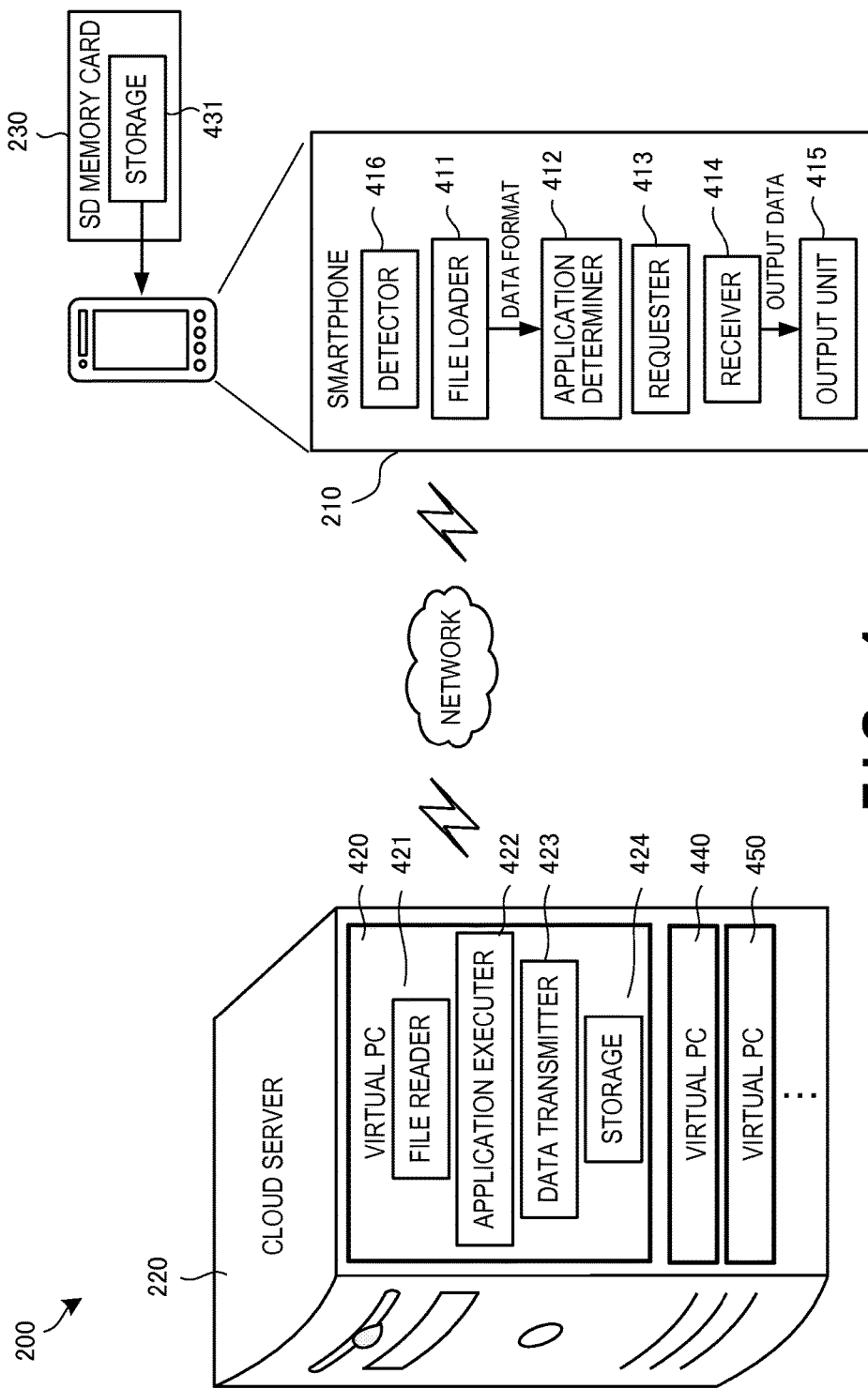
FIG. 4 is a block diagram showing the arrangement of the information processing system according to the second embodiment of the present invention.

FIG. 4 is a block diagram showing the functional arrangement of the information processing system 200. The functional arrangement of the information processing system 200 will be described with reference to FIG. 4.

The information processing system 200 includes the smartphone 210, and the cloud server 220. The smartphone 210 accepts the SD memory card 230.

The smartphone 210 includes the file loader 411, an application determiner 412, a requester 413, a receiver 414, an output unit 415, and the detector 416. The SD memory card 230 has a storage 431. The cloud server 220 includes virtual PCs (Personal Computers) 420, 440, 450, . . . . The virtual PC 420 includes a file reader 421, an application executer 422, a data transmitter 423, and a storage 424.

The detector 416 of the smartphone 210 detects connection of the SD memory card 230 to the smartphone 210. The file loader 411 loads a file stored in the storage 431 of the SD memory card 230 whose connection is detected. The application determiner 412 determines whether the smartphone 210 holds an application capable of processing the loaded file. Upon determining that no application is held, the requester 413 requests, from the cloud server 220, output data outputtable for the user at the smartphone 210. This request is transmitted while including not only the file stored in the SD memory card 230 but also information of a data format outputtable or expandable by the smartphone 210, an outputtable data capacity, and the like.

Upon accepting the request and the file unprocessable by the smartphone 210, the virtual PC 420 of the cloud server 220 causes the file reader 421 to read out the file. A virus detector (not shown) can either detect whether the readout file includes a virus or disinfect a detected virus.

The virtual PC 420 stores the readout file in the storage 424. The application executer 422 executes an application that can process the file read out by the file reader 421 and acquires output data outputtable by the smartphone 210 from the execution screen data of the application. The data transmitter 423 transmits the output data of the file executed by the application executer 422 to the smartphone 210. Note that the storage 424 may store the output data, and the data transmitter may transmit the output data at a timing requested by the smartphone 210.

In the smartphone 210, when the receiver 414 receives the output data transmitted from the data transmitter 423, the output unit 415 outputs the output data.

(Application Processable Data Format)

Figure 5:
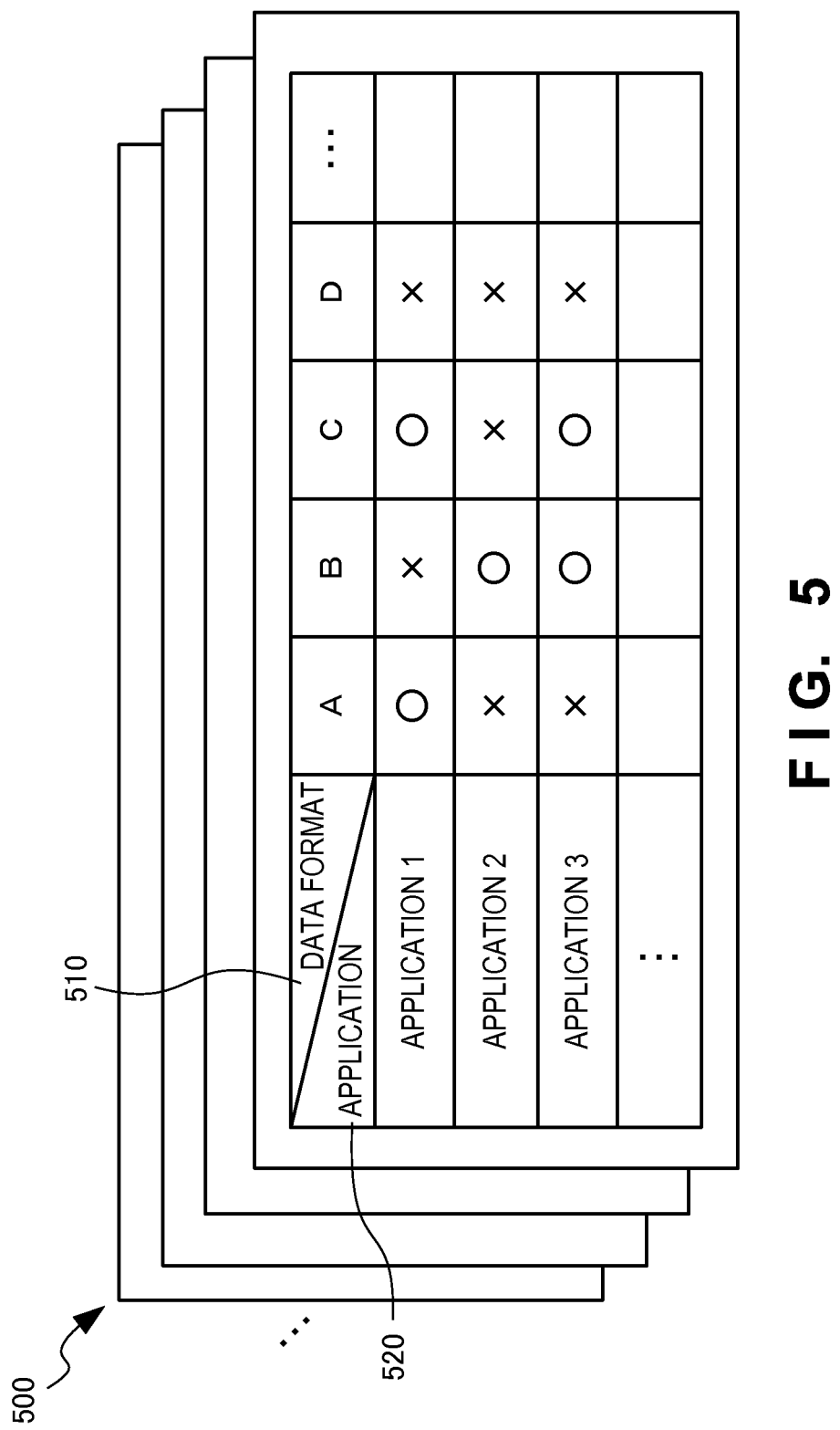
FIG. 5 is a view showing tables used to determine data formats outputtable by a smartphone according to the second embodiment of the present invention.

A table used to determine data formats outputtable for the user by the smartphone 210 will be described with reference to FIG. 5.

A data format 510 in a table 500 indicates a data format loadable by an application held in the smartphone 210. There are various kinds of data formats including html, text file, script, image, audio, and application, for example, HTML file (.html), text file (.txt), word processor file (.doc), PDF file (.pdf), graphics interchange format (.gif), Joint Photographic Experts Group (.jpg), and musical instrument digital interface (.midi). However, the data formats are not limited to those.

An application 520 indicates various kinds of applications held in the smartphone 210. The smartphone 210 holds applications 1 to 3. Application 1 can process data formats A and C. Application 2 can process only files in data format B. However, none of the applications can process files in data format D. Hence, the smartphone 210 requests, from the cloud server 220, a data format outputtable for the user from a file in data format D.

(Hardware Arrangement of Cloud Server)

Figure 6:
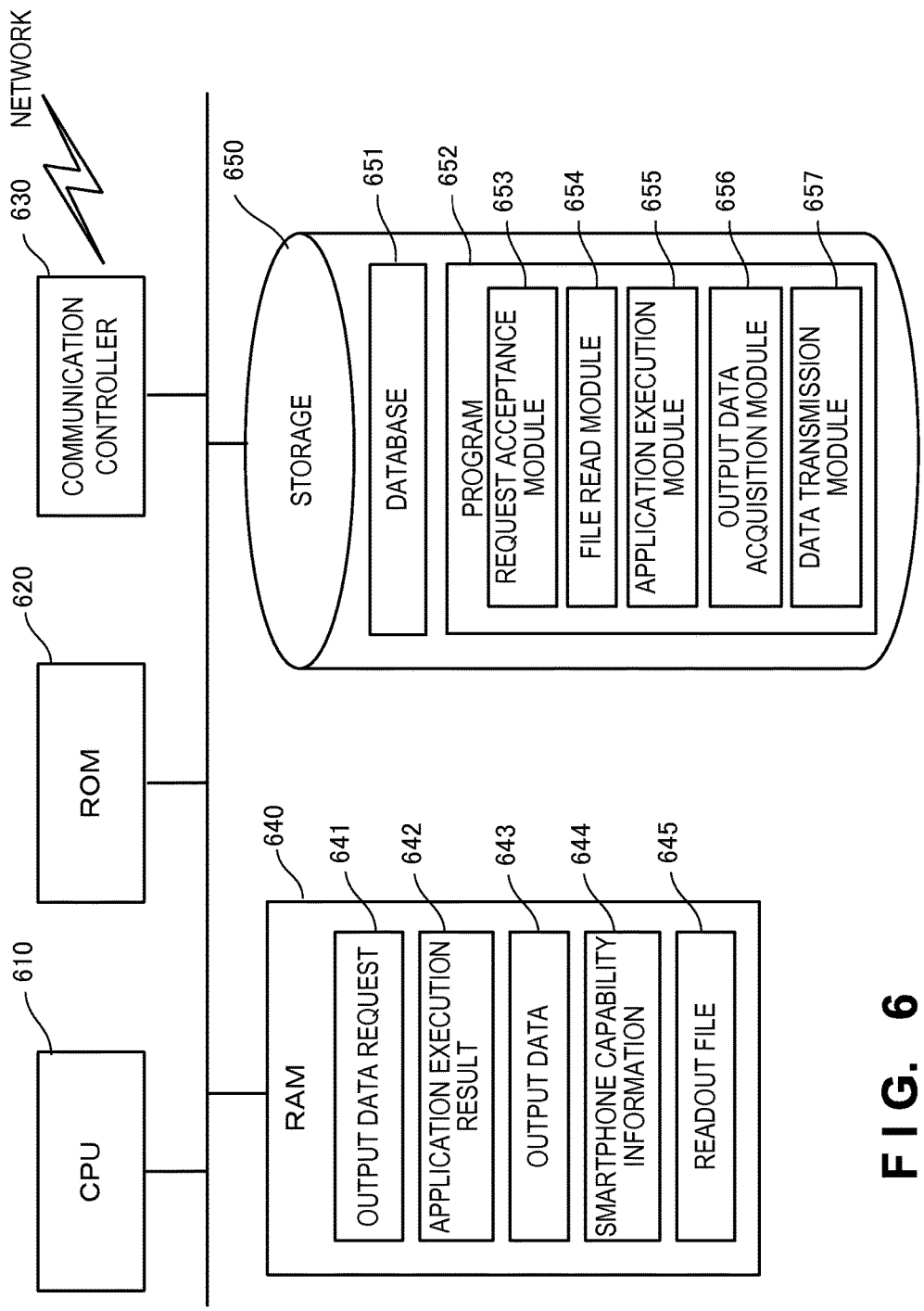
FIG. 6 is a block diagram showing the hardware arrangement of a cloud server according to the second embodiment of the present invention.

The hardware arrangement of the cloud server 220 will be described with reference to FIG. 6. FIG. 6 is a block diagram showing the hardware arrangement of the cloud server 220.

The cloud server 220 includes a CPU 610, a ROM 620, a communication controller 630, a RAM 640, and a storage 650. The CPU 610 is a central processor and controls the entire cloud server 220 by executing various programs. The ROM 620 is a read-only memory and stores various kinds of parameters in addition to a boot program to be executed by the CPU 610 first. The RAM 640 stores an output data request 641, an application execution result 642, output data 643, smartphone capability information 644, and a readout file 645.

On the other hand, the storage 650 stores a database 651 and a program 652. The communication controller 630 controls communication with the smartphone 210 or another terminal via the network.

The output data request 641 is an output data request accepted from the smartphone 210 and temporarily stored. The application execution result 642 is a temporarily stored result of file processing by the application executer 422 using an application capable of processing a file. The output data 643 is output data acquired from the application executer 422 and temporarily stored. The smartphone capability information 644 is transmitted from the smartphone 210 together with the request and temporarily stored as the capability of the smartphone 210, including information of outputtable data formats and outputtable data capacities. The readout file 645 is a temporarily stored readout file unprocessable by the smartphone 210.

The functions of modules accumulated in the program 652 will be described. A request acceptance module 653 functions to accept an output data request transmitted from the smartphone 210. A file read module 654 functions to cause the file reader 421 to read out a file based on the request accepted from the smartphone 210. An application execution module 655 functions to cause the application executer 422 to process the file transmitted from the smartphone 210 and read out by the file reader 421. An output data acquisition module 656 functions to cause the application executer 422 to acquire output data outputtable by the smartphone 210. A data transmission module 657 functions to transmit the output data acquired from the application executer 422 to the smartphone 210.

(Flowchart Showing Processing of Procedure to Be Performed by Cloud Server)

Figure 7:
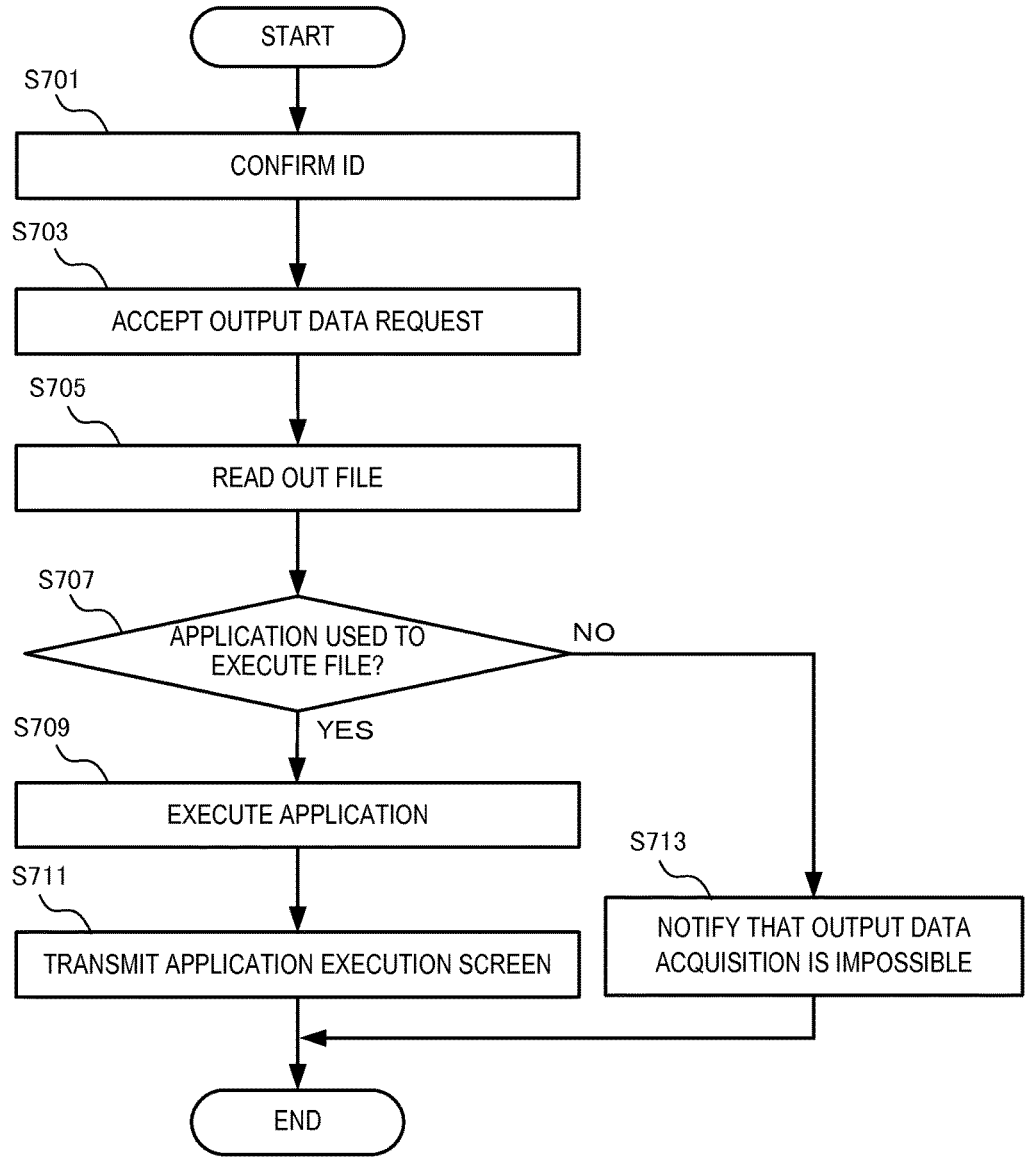
FIG. 7 is a flowchart showing processing of the procedure of the cloud server according to the second embodiment of the present invention.

FIG. 7 is a flowchart showing processing of the procedure of the cloud server 220.

In step S701, upon accepting login from the smartphone 210, the file reader 421 confirms the ID (identity document) of the user. In step S703, the file reader 421 accepts an output data request from the smartphone 210. In step S705, the file reader 421 reads out the received file in response to the request accepted from the smartphone 210. The file to be read out can be a file transmitted from the smartphone 210 or a file stored on a web site and to be read out by accessing a URL (Uniform Resource Locator).

In step S707, the application executer 422 confirms whether the cloud server 220 can execute an application capable of processing the file. If no application is executable, the process advances to step S713, and the data transmitter 423 notifies the smartphone 210 that the output data cannot be acquired. If an application is executable, the application executer 422 executes the application and acquires the output data from the file accepted from the smartphone 210 in step S709. In step S711, the data transmitter 423 transmits the acquired output data to the smartphone 210.

(Flowchart Showing Processing of Procedure to Be Performed by Smartphone)

Figure 8:
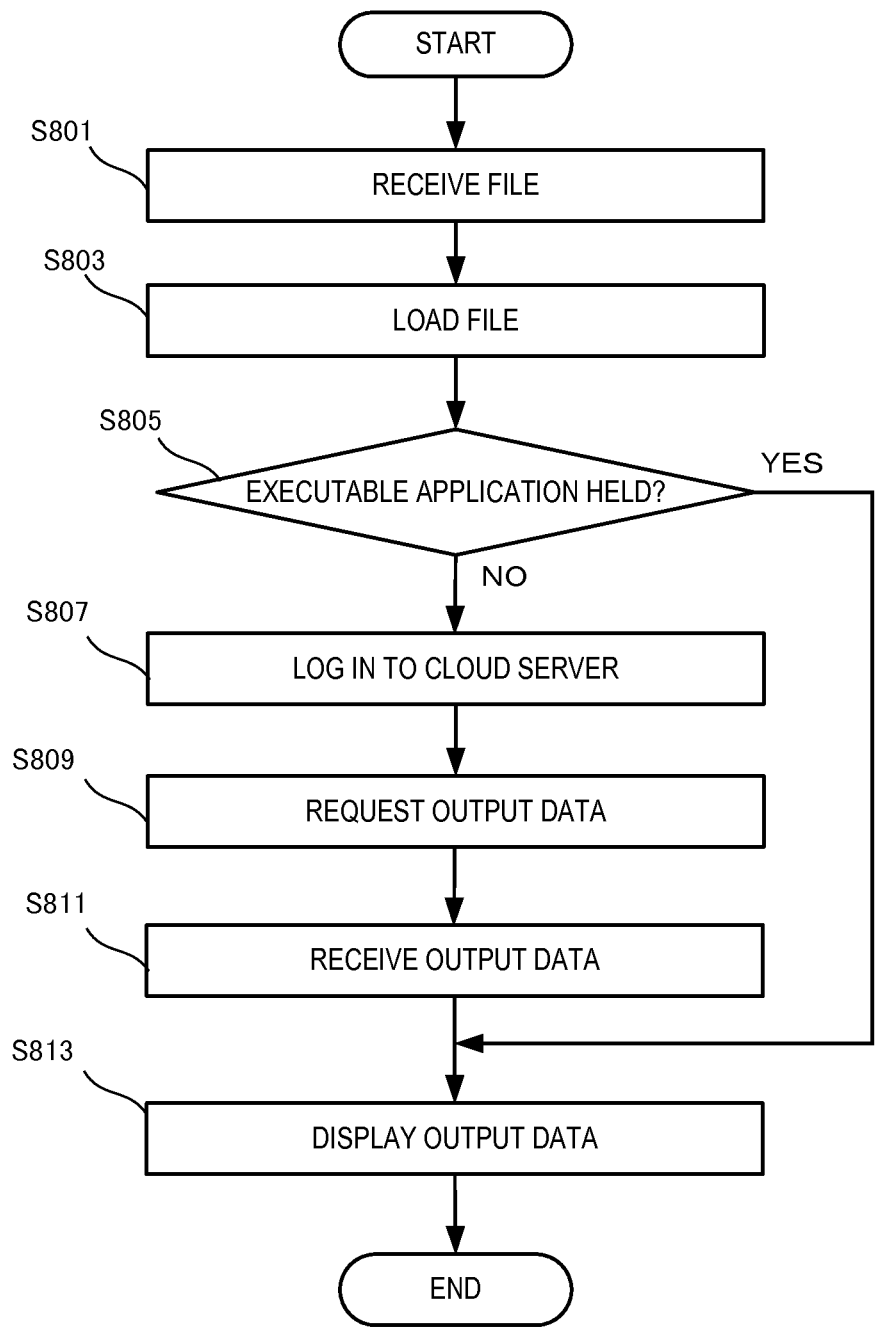
FIG. 8 is a flowchart showing processing of the procedure of the smartphone according to the second embodiment of the present invention.

FIG. 8 is a flowchart showing processing of the procedure of the smartphone 210.

In step S801, the detector 416 detects connection of the SD memory card 230 to the smartphone 210. In step S803, the file loader 411 loads a file stored in the SD memory card 230. In step S805, the application determiner 412 determines whether the smartphone 210 can process the file by an application held in it. Upon determining that the smartphone 210 can output data for the user, the process advances to step S813 to output the output data. Upon determining that no application held in the smartphone 210 can process the file, the process advances to step S807, and the application determiner 412 starts logging in to the cloud server 220.

In step S809, the requester 413 requests the output data from the cloud server 220. In step S811, the receiver 414 receives the output data from the cloud server 220. In step S813, the output unit 415 outputs the received output data.

With the above-described arrangement and operation, according to the information processing system of this embodiment, if a file unprocessable by the communication terminal exists, outputtable data can be acquired and output using the server.

Third Embodiment

Figure 9:
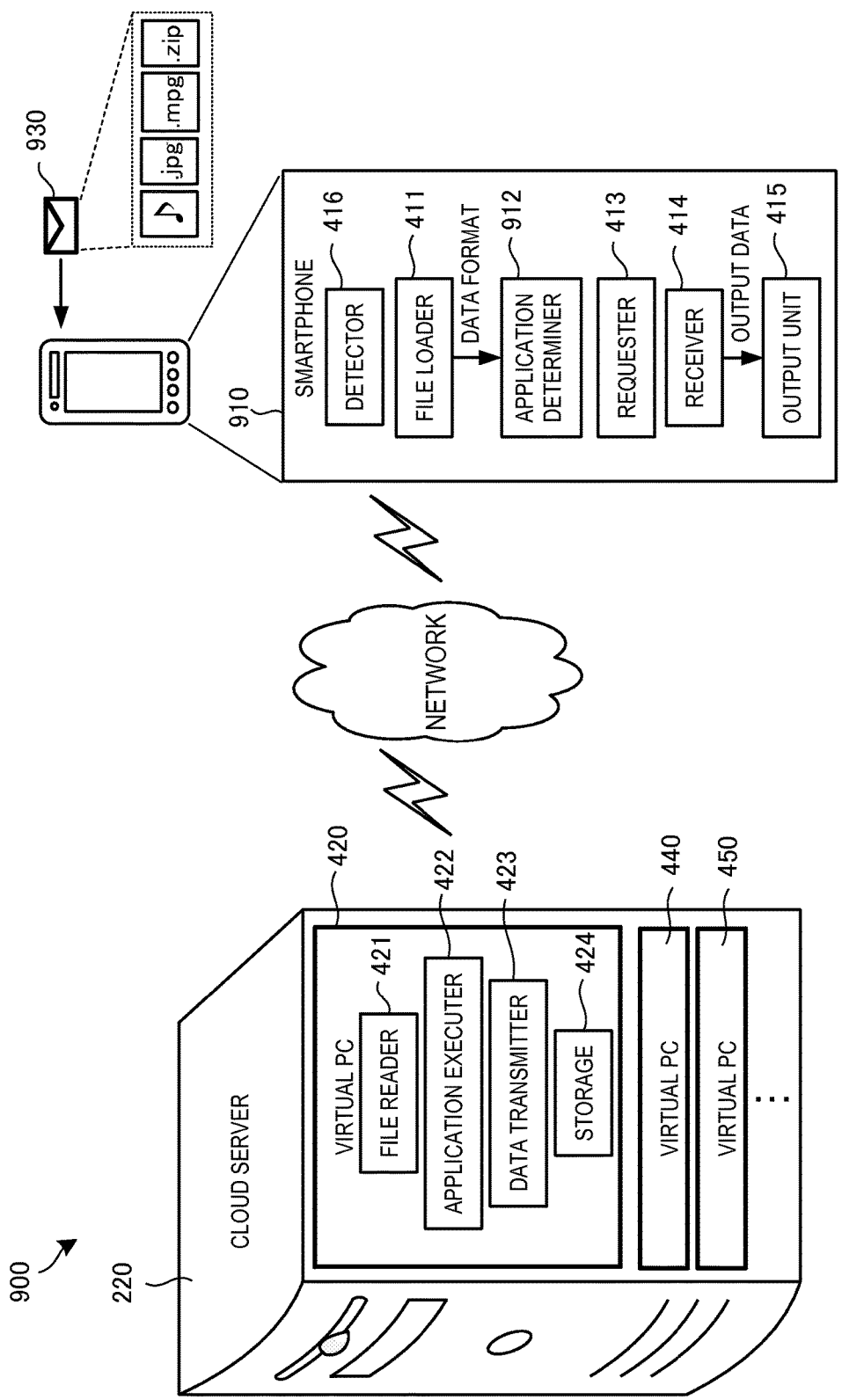
FIG. 9 is a block diagram showing the arrangement of an information processing system according to the third embodiment of the present invention.

An information processing system 900 according to the third embodiment of the present invention will be described next with reference to FIG. 9. FIG. 9 is a block diagram for explaining the functional arrangement of the information processing system 900 according to this embodiment.

The information processing system 900 according to this embodiment is different from the second embodiment in that the smartphone 210 receives email. The rest of the components and operations is the same as in the second embodiment. The same reference numerals as in the second embodiment denote the same components and operations, and a detailed description thereof will be omitted.

In the information processing system 900, if a file attached to email 930 received by a smartphone 910 cannot be processed by an application held in the smartphone 910, a cloud server 220 is requested to process the attached file and transmits output data to the smartphone 910 so that the smartphone can output the data.

The information processing system 900 includes the smartphone 910 and a cloud server 220. The smartphone 910 receives a music file (.midi), an image file (.jpg), a moving image file (.mpg), or a compressed file (.zip) attached to the email 930. The smartphone 910 causes an application determiner 912 to determine whether it holds an application capable of processing audio data, image data, or another data format. If no application is held, a requester 413 transmits a request to the cloud server 220 via a network. The requester 413 transmits the attached file of the email 930 together with the request. An application executer 422 processes the attached file by an application that processes the attached file read out by a file reader 421 and acquires data outputtable by the smartphone 910.

With the above-described arrangement and operation, according to the information processing system of this embodiment, even if a file unprocessable by the smartphone is received, it can be output or reproduced using the cloud server.

Fourth Embodiment

Figure 10:
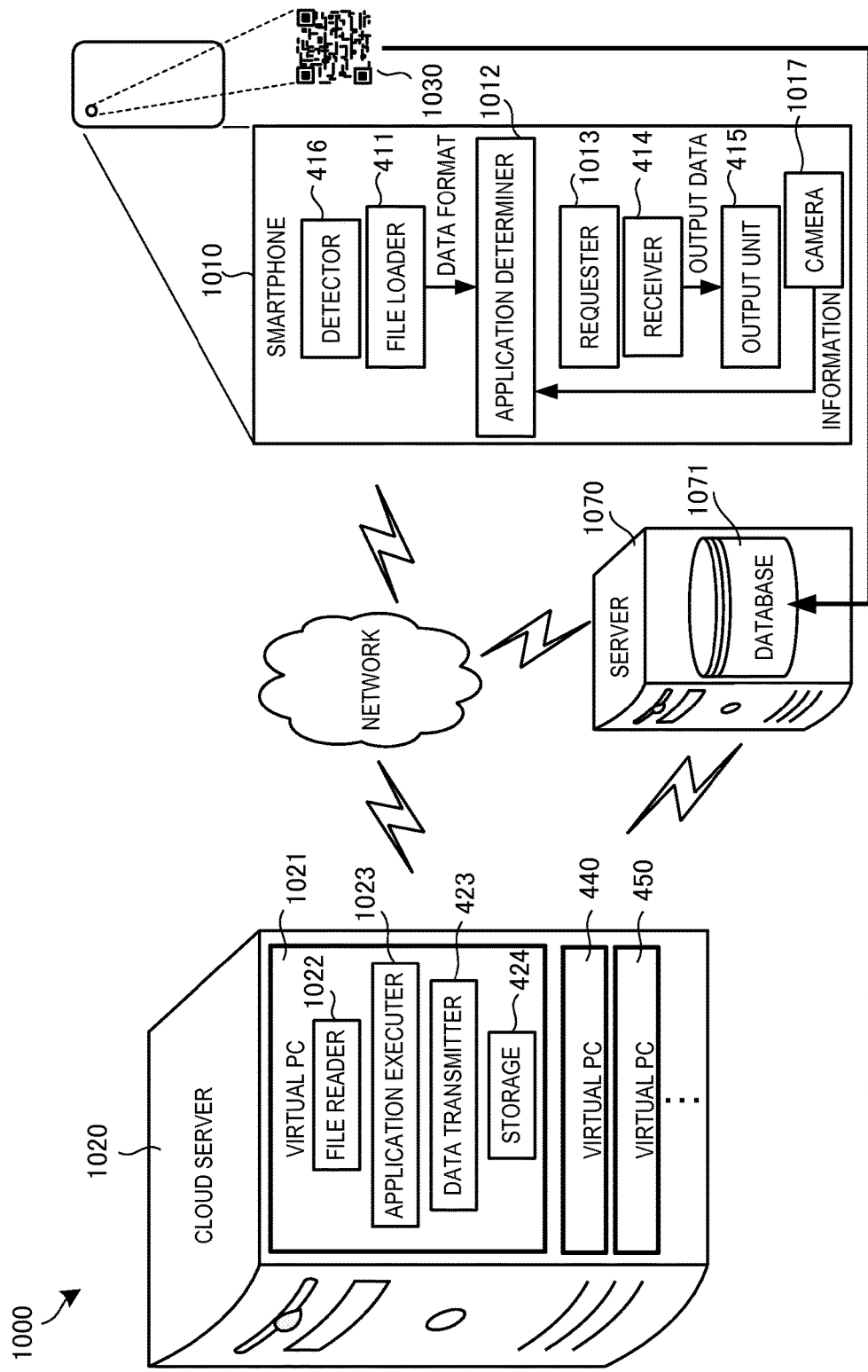
FIG. 10 is a block diagram showing the arrangement of an information processing system according to the fourth embodiment of the present invention.

An information processing system 1000 according to the fourth embodiment of the present invention will be described next with reference to FIG. 10. FIG. 10 is a block diagram for explaining the functional arrangement of the information processing system 1000 according to this embodiment.

The information processing system 1000 according to this embodiment is different from the second embodiment in that a smartphone 1010 holds a URL or the like serving as information of a file storage source, instead of holding a file in it or via an auxiliary storage device such as an SD memory card. The rest of the components and operations is the same as in the second embodiment. The same reference numerals as in the second embodiment denote the same components and operations, and a detailed description thereof will be omitted.

In the information processing system 1000, a camera 1017 of the smartphone 1010 captures a two-dimensional code 1030, and file storage source information written in the two-dimensional code 1030 is acquired. A requester 1013 transmits the file storage source information read from the two-dimensional code 1030 to a cloud server 1020 via a network. A file reader 1022 of a virtual PC 1021 reads out the received storage source information, accesses a server 1070 as the storage source, and reads out a file stored in a database 1071. An application executer 1023 executes an application and processes the readout file. The processing result is sent from a data transmitter 423 to a receiver 414 in the smartphone 1010 and output from an output unit 415. Note that capability information of the output unit 415 of the smartphone 1010 may be attached to the file storage source information to be transmitted from the smartphone 1010 to the cloud server 1020. When the cloud server 1020 stores the performance of the smartphone 1010 in advance, the capability information need not be attached. Transmission of the file storage source information to the cloud server 1020 may be done when an application determiner 1012 of the smartphone 1010 determines whether the file read out from the database 1071 based on the two-dimensional code 1030 is processable, and the file is then determined to be unprocessable.

Figure 11:
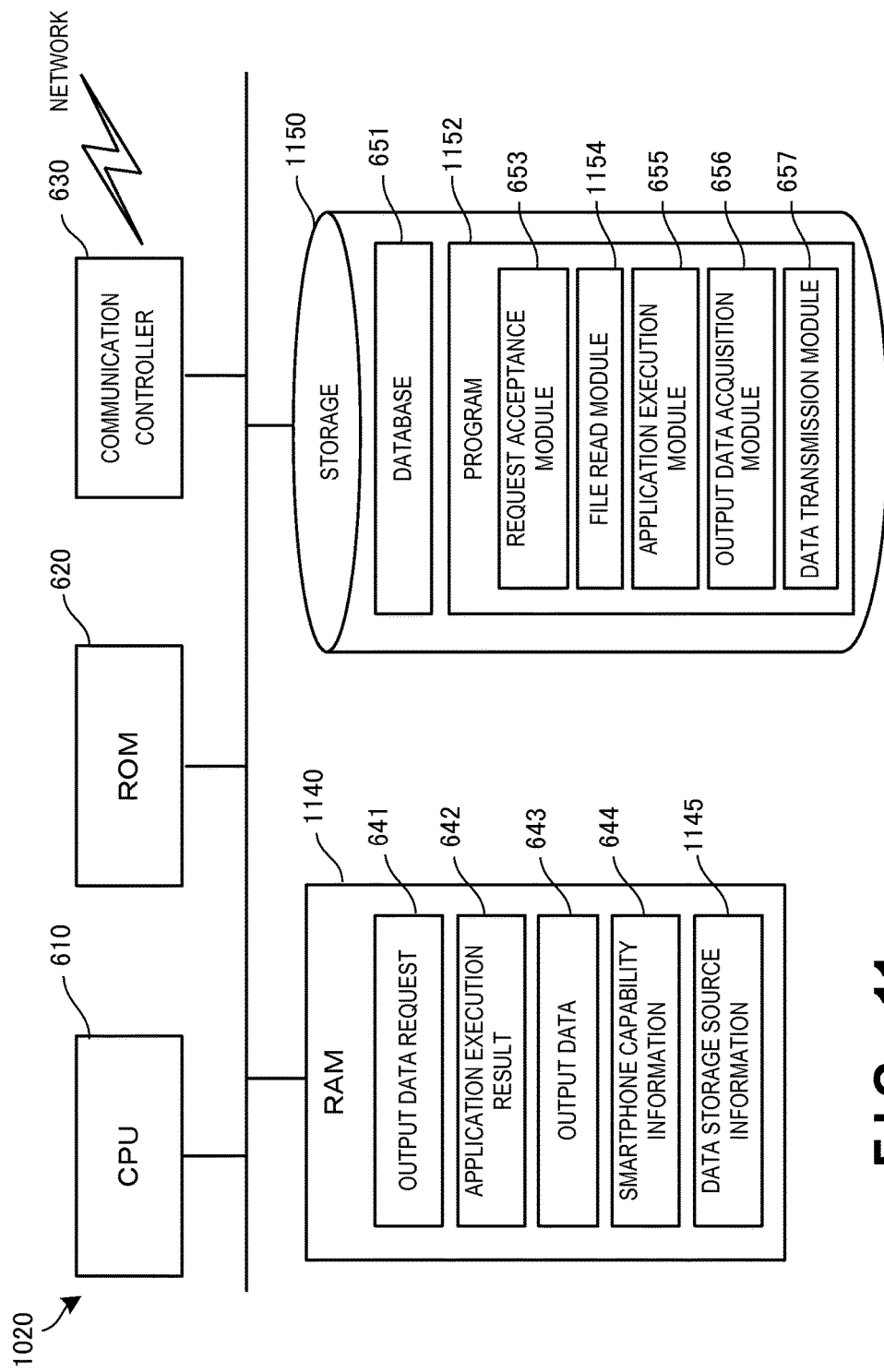
FIG. 11 is a block diagram showing the hardware arrangement of a cloud server according to the fourth embodiment of the present invention.

FIG. 11 is a block diagram showing the hardware arrangement of the cloud server 1020. Data storage source information 1145 in a RAM 1140 is the two-dimensional code 1030 or URL serving as file storage source information transmitted from the smartphone 1010 and temporarily stored. A file read module 1154 of a program 1152 stored in a storage 1150 functions to access the storage source information read from the two-dimensional code 1030 and read out a file from the database 1071.

With the above-described arrangement and operation, according to the information processing system of this embodiment, if a file unprocessable by the communication terminal exists, outputtable data can be acquired and displayed/reproduced by transmitting the storage source information of the file to the cloud server.

Fifth Embodiment

Figure 12:
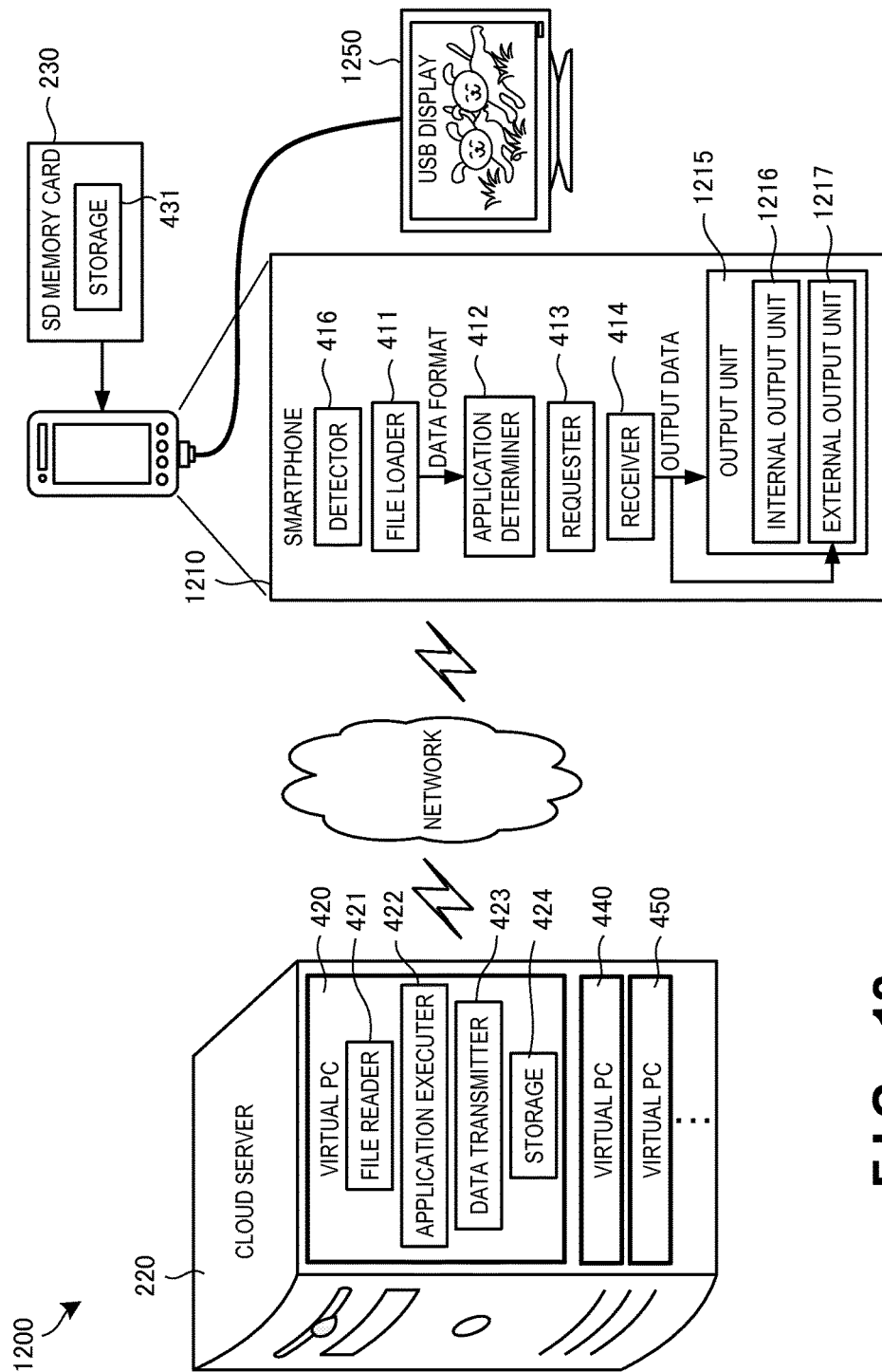
FIG. 12 is a block diagram showing the arrangement of an information processing system according to the fifth embodiment of the present invention.

An information processing system 1200 according to the fifth embodiment of the present invention will be described next with reference to FIG. 12. FIG. 12 is a block diagram for explaining the functional arrangement of the information processing system 1200 according to this embodiment.

The information processing system 1200 according to this embodiment is different from the second embodiment in that a smartphone includes an external output unit, and a USB display is connected to the smartphone. The rest of the components and operations is the same as in the second embodiment. The same reference numerals as in the second embodiment denote the same components and operations, and a detailed description thereof will be omitted.

In the information processing system 1200, an output unit 1215 of a smartphone 1210 includes an internal output unit 1216 and an external output unit 1217. Upon receiving output data transmitted from a data transmitter 423, a receiver 414 sends it to the external output unit 1217. The external output unit 1217 transmits the output data to a USB display 1250 connected via a hub. The USB display 1250 reads out the received output data and displays it on the display 1250. An application determiner 412 of the smartphone 1210 may determine not only whether the acquired file is processable by the smartphone 1210 but also whether, for example, the output data displayable by the USB display 1250 is possible by the smartphone 1210. That is, when the smartphone 1210 cannot generate output data displayable by the USB display 1250 even if it can process the acquired file, the application determiner 412 requests the cloud server 220 to create output data displayable by the USB display 1250.

With the above-described arrangement and operation, according to the information processing system of this embodiment, even if a file unprocessable by the smartphone is received, data reproduced using a cloud server can be not only received and displayed by the smartphone but also output to or reproduced by an output device connected to the communication terminal.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program.

This application claims the benefit of Japanese Patent Application No. 2012-067497 filed on Mar. 23, 2012, which is hereby incorporated by reference herein in its entirety.

The invention claimed is:
1. An information processing system, comprising:
a communication device; and
a server,
wherein the communication device comprises:
 a first memory storing first instructions; and
 at least one first processor configured to execute first instructions load a file;
  determine whether the communication device has an application that can process the loaded file and generate, from the processed file, output data in an outputtable data format to be output at the communication device;
  when it has been determined that the communication device does not have the application, connect the communication device with the server via a wireless communication network and transmit, to the server, a first request with information used to generate the output data in the outputtable data format, of supplying the output data in the outputtable data format by processing the file and generating the output data from the processed file;
  receive the output data in the outputtable data format, transmitted from the server connected via the wireless communication network in response to a second request transmitted to the server; and
  output the received output data in the outputtable data format without any data conversions, and
wherein the server comprises:
a second memory storing second instructions; and
at least one second processor configured to execute the second instructions to:
 acquire the file and the information used to generate the output data in the outputtable data format from the communication device in response to the first request received from the communication device;
 select, in accordance with the acquired file and the acquired information, an application that can process the acquired file and generate the output data in the outputtable data format from the processed file;

execute the selected application to process the acquired file and to generate the output data in the outputtable data format from the processed file;

accumulate the generated output data in the outputtable data format in an accumulator; and when receiving the second request from the communication device, transmit the generated and accumulated output data in the outputtable data format to the communication device via the wireless communication network.

2. The information processing system according to claim 1, wherein the information used to generate the output data in the outputtable data format includes the outputtable data format and a data capacity able to be output at the communication device.

3. The information processing system according to claim 1, wherein the first instructions to transmit the request include instructions to transmit, to the server, the loaded file for which the determiner has determined that the communication device does not have the application.

4. The information processing system according to claim 1, wherein the first instructions to transmit the request include instructions to obtain storage source information of the file, for which it has been determined that the communication device does not have the application, and to transmit the storage source information to the server.

5. The information processing system according to claim 1, wherein the at least one first processor of the communication device is further configured to execute instructions to detect connection and disconnection of an auxiliary storage device, and wherein the first instructions to load the file include instructions to load the file from the auxiliary storage device when detecting the connection of the auxiliary storage device.

6. The information processing system according to claim 5, wherein the at least one second processor of the server is further configured to execute instructions to detect a virus included in the acquired file, for it has been determined that the communication device does not have the application.

7. The information processing system according to claim 1, wherein the output unit includes at least one of a display and an audio output unit, and the output data in the outputtable data format includes at least one of display data and audio data.

8. An information processing method, comprising:

loading a file into a communication device;

determining, at the communication device, whether the communication device has an application that can process the file and generate, from the processed file, output data in an outputtable data format to be output at the communication device;

connecting the communication device with a server via a wireless communication network, and transmitting, from the communication device to the server, a first request with information used to generate the output data in the outputtable data format, of supplying the output data in the outputtable data format by processing the file and generating the output data in the outputtable data format from the processed file, when it has been determined that the communication device does not have the application;

acquiring, at the server, the file and the information used to generate the output data in the outputtable data format, transmitted from the communication device in response to the first request transmitted from the communication device;

selecting, at the server, an application that can process the file and generate the output data in the outputtable data format from the processed file in accordance with the acquired file and the acquired information used to generate the output data in the outputtable data format;

executing, at the server, the selected application to process the acquired file and to generate the output data in the outputtable data format from the processed file;

when sending a second request from the communication device to the server, transmitting the generated and accumulated output data in the outputtable data format from the server to the communication device connected via the wireless communication network; and outputting the received output data in the outputtable data format at the communication device without any data conversions.

9. A communication device, comprising:

a memory storing instructions; and at least one processor configured to execute the instructions load a file;

determine whether the communication device has an application that can process the loaded file and generate, from the processed file, output data in an outputtable data format to be output at the communication device;

when it has been determined that the communication device does not have the application, connect the communication device with a server via a wireless communication network, and to transmit, to the server, a first request with information used to generate the output data in the outputtable data format, of supplying the output data in the outputtable data format by processing the file and generating the output data in the outputtable data format from the processed file;

receive the output data in the outputtable data format that had been generated and accumulated by the server, transmitted from the server connected via the wireless communication network when transmitting a second request to the server; and output the received output data in the outputtable data format without any data conversions.

10. A control method of a communication device, comprising:

loading a file;

determining whether the communication device has an application processing the loaded file and generating, from the processed file, output data in an outputtable data format to be output at the communication device;

connecting the communication device with a server via a wireless communication network, and transmitting, to the server, a first request with information used to generate the output data in the outputtable data format, of supplying the output data in the outputtable data format by processing the file and generating the output data in the outputtable data format from the processed file, when it has been determined that the communication device does not have the application;

receiving the output data in the outputtable data format that had been generated and accumulated by the server, transmitted from the server connected via the wireless communication network when transmitting a second request to the server; and outputting the received output data in the outputtable data format without any data conversions.

11. A tangible, non-transitory computer-readable storage medium storing computer-executable instructions that, when executed by a processor of a communication device, cause the processor to execute a method, comprising:

loading a file;

determining whether a communication device has an application that can process the loaded file and generate, from the processed file, output data in an outputtable data format to be output at the communication device;

connecting the communication device with a server via a wireless communication network, and transmitting, to the server, a first request with information used to generate the output data in the outputtable data format, of supplying the output data in the outputtable data format by processing the file and generating the output data in the outputtable data format from the processed file, when it has been determined that the communication device does not have the application;

receiving the output data in the outputtable data format that had been generated and accumulated by the server, transmitted from the server connected via the wireless communication network when transmitting a second request to the server; and outputting the received output data in the outputtable data format without any data conversions.

12. A server included in an information processing system, comprising:

a memory storing instructions; and at least one processor configured to execute instructions to:

acquire a file to be processed and information used to generate output data, in response to a first request with the information used to generate the output data in the outputtable data format of supplying the output data in an outputtable data format, transmitted from a communication device when the communication device has determined that the communication device does not have an application that can process the file and generate, from the processed file, the output data in the outputtable data format to be output at the communication device;

select, in accordance with the acquired file and the acquired information, an application that can process the acquired file and generate the output data in the outputtable data format from the processed file;

execute the selected application to process the acquired file and to generate the output data in the outputtable data format from the processed file;

accumulate the generated output data in the outputtable data format in an accumulator; and when receiving a second request from the communication device, transmit the generated and accumulated output data in the outputtable data format to the communication device via a wireless communication network.

13. A control method of a server included in an information processing system, the method comprising:

acquiring a file to be processed and information used to generate output data, in response to a first request with the information used to generate the output data in the outputtable data format of supplying the output data in an outputtable data format, transmitted from a communication device when the communication device determined that the communication device does not have an application that can process the file and generate, from the processed file, the output data in the outputtable data format to be output at the communication device;

selecting, in accordance with the acquired file and the acquired information, an application that can process the acquired file and generate the output data in the outputtable data format from the processed file;

executing the selected application to process the acquired file and to generate the output data in the outputtable data format from the processed file;

accumulating the generated output data in the outputtable data format in an accumulator; and at a timing of receiving a second request from the communication device, transmitting the generated and accumulated output data in the outputtable data format to the communication device via a wireless communication network.

14. A tangible, non-transitory computer-readable storage medium storing computer-executable instructions that, when executed by a processor of a server, cause the processor to execute a method, comprising:

acquiring, at a server, a file to be processed and information used to generate output data in the outputtable data format, in response to a first request with the information used to generate the output data in the outputtable data format of supplying the output data in an outputtable data format, transmitted from a communication device when the communication device determined that the communication device does not have an application that can process the file and generate, from the processed file, the output data in the outputtable data format to be output at the communication device;

selecting an application that can process the file and generate the output data in the outputtable data format from the processed file;

executing the selected application to process the file and to generate the output data in the outputtable data format from the processed file;

accumulating the generated output data in the outputtable data format in an accumulator; and when receiving a second request from the communication device, transmitting the generated and accumulated output data in the outputtable data format to the communication device via a wireless communication network.

15. The information processing system according to claim 1, wherein the at least one first processor of the communication device is further configured to execute instructions to detect receiving email, and to load the file attached in the detected email.

16. The information processing system according to claim 1, wherein the second instructions to be executed by the at least one second processor of the server is executed in a virtual computer made in the server, and the communication device is configured to function as an input and output device connected to the virtual computer via the wireless communication network.

17. The information processing system according to claim 1, wherein the communication device comprises a smartphone.

18. The information processing system according to claim 17, wherein the server comprises a cloud server.

* * * * *